United States Patent
Michellone et al.

[15] 3,707,313
[45] Dec. 26, 1972

[54] ANTI-SKID BRAKING SYSTEMS

[72] Inventors: Giancarlo Michellone, Cambiano; Mario Palazzetti; Giovanni Tabasso, both of Turin, all of Italy

[73] Assignee: Fiat Societa per Azioni, Turin, Italy

[22] Filed: Jan. 6, 1971

[21] Appl. No.: 104,372

[30] Foreign Application Priority Data

Jan. 13, 1970 Italy.....................67084-A/70

[52] U.S. Cl.................303/21 A, 188/195, 303/21 F, 303/22 R
[51] Int. Cl. ............................B60t 8/10, B60t 8/18
[58] Field of Search.............188/195; 303/21, F, 21 BE, 21 EB, 303/22 R, 21 A

[56] References Cited

UNITED STATES PATENTS

| | | | |
|---|---|---|---|
| 3,576,350 | 4/1971 | Larsen | 303/21 F |
| 3,556,609 | 1/1971 | MacDuff | 303/21 F |
| 3,556,608 | 1/1971 | MacDuff et al. | 303/21 F |
| 3,479,094 | 11/1969 | Chouings | 303/22 R |

*Primary Examiner*—Evon C. Blunk
*Assistant Examiner*—W. Scott Carson
*Attorney*—Sughrue, Rothwell, Mion, Zinn & Macpeak

[57] ABSTRACT

A vehicle braking system has an anti-skid device which periodically interrupts the supply of pressure fluid to the brake of a first wheel on a first axle. A second wheel on a second axle is equipped with known means to vary the braking effort on that second wheel in accordance with the load on the second axle. The invention provides means to vary the supply to the brake of the second wheel in accordance with fluctuations induced by the anti-skid device in the supply to the brake of the first wheel.

3 Claims, 3 Drawing Figures

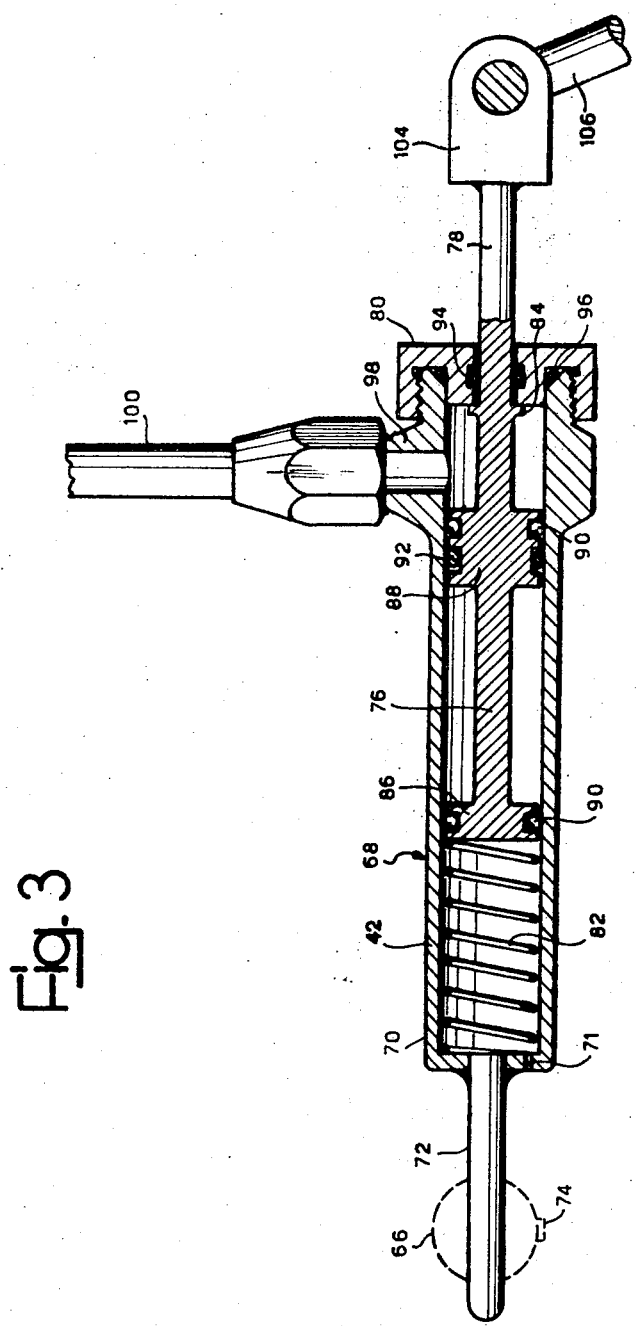

ANTI-SKID BRAKING SYSTEMS

This invention relates to a vehicle braking system in which anti-skid control of a wheel on a first axle is extended to another wheel on a second axle.

The increasing speeds of modern vehicles, both road and rail vehicles, have led to the increasingly widespread use of anti-skid braking systems, particularly in vehicles provided with servo-brakes, such as trains, industrial road vehicles with two or more axles, and the like.

Anti-skid braking systems generally call for at least one sensor and an anti-skid control apparatus for every wheel or axle which is required to be prevented from skidding. This leads to considerable expense, particularly in vehicles with more than two axles.

An object of the invention is to provide means extending the anti-skid braking control of one wheel to another wheel on a different axle at considerably less expense than would be required to provide each wheel with a separate anti-skid system.

The invention takes account of the fact that the optimum pressure to be applied in the pressure circuit (usually pneumatic or hydraulic) governing the brakes of a wheel depends on the conditions of contact between the wheel and the ground or rail on which the wheel travels, and therefore on the condition of both the wheel and the ground or rail. The load on the axle may vary greatly from one wheel to another, more particularly in the case of the rear axles of an industrial vehicle such as a lorry, trailer or the like, whereas the condition of the ground or rail and the properties of the wheels are largely the same for all the axles.

The invention is therefore based on the principle of utilizing the anti-skid control signals of one wheel of a vehicle to control the braking of a further wheel, with interposed correcting means to compensate for the differences between the loads on the various wheels; on the assumption, however, that the conditions of the ground or track are the same for both the wheels.

Although cases may arise in which the condition of the ground or track is different for two or more wheels of a vehicle, such a situation is extremely rare and moreover the differences that arise are usually confined within narrow limits.

The invention provides a vehicle having a first wheel on a first axle and a second wheel on a second axle, a braking system for the wheels including a fluid pressure circuit and a brake on each wheel connected to the circuit, an anti-skid pressure regulating device connected in the circuit to regulate the pressure applied to the brake of the first wheel during braking of the vehicle and means to vary the pressure applied to the brake of the second wheel according to the load on the second axle; characterized by means to vary the pressure applied to the brake of the second wheel according to variations induced by the anti-skid device in the pressure applied to the brake of the first wheel.

An embodiment of the invention is described below with reference to the accompanying drawings, in which:

FIG. 3 is a longitudinal sectioned view on an enlarged scale of an actuating device seen in FIG. 2.

Figure 1:
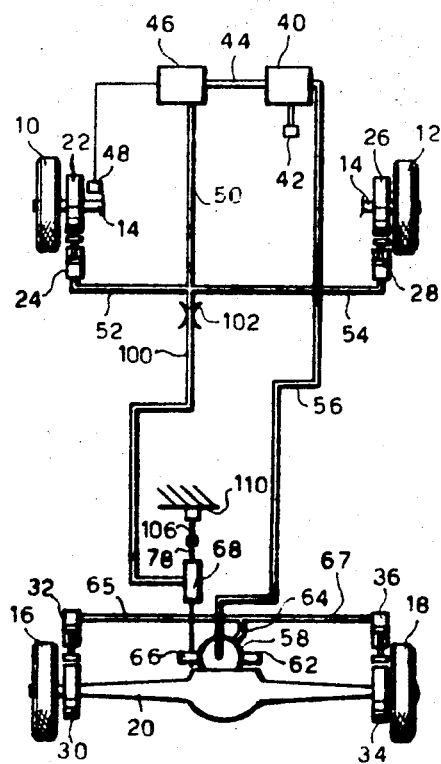
FIG. 1 is a diagram in plan view of a pneumatic braking system of a two-axled vehicle.

In FIG. 1, a vehicle with a pneumatic braking system has a pair of front wheels 10,12 on a front axle 14 (which may in practice be a pair of semi-axles), and a pair of rear wheels 16, 18 on a rear axle 20 (which may equally comprise semi-axles). The wheel 10 has a brake 22 acted on by a cylinder 24. Similarly the wheel 12 has a brake 26 and cylinder 28. The wheel 16 has a brake 30 and cylinder 32, and the wheel 18 has a brake 34 and cylinder 36.

The braking system includes a source 40 of pneumatic fluid under pressure, and a pedal 42 designed to operate the vehicle brakes and thereby send fluid under pressure from the source 40 into a braking circuit. These components are conventional. The circuit includes a conduit 44 leading from the source 40 to an anti-skid pressure regulating device 46 which operates in response to the action of a sensor 48 which senses the dynamic condition of the wheel 10. The device 46 is connected by conduits 50,52 and 54 to the brake cylinders 24 and 28 operating on the vehicle's front wheels.

The anti-skid device may take any suitable form. One known simple device has as the sensor 48 a tachometer which supplies an electrical signal to a differentiator circuit to produce a signal representative of the vehicle acceleration. This signal is fed to a bistable device with a normally low output, arranged to be set in its high output condition by a high vehicle deceleration signal. The output of the bistable device is connected to a power amplifier operating a solenoid valve connected between the conduits 44 and 50. The valve is a three-way, two-position valve, two of its ports being connected to the conduits 44 and 50 and the third being an exhaust port opening to the atmosphere. When the vehicle deceleration is low, the valve connects the conduits 44, 50 to each other. When the vehicle deceleration exceeds a predetermined value, indicating incipient locking of the wheel 10, the valve closes the conduit 44 and opens the conduit 50 to exhaust, allowing the pressure in the cylinders 24,28 to fall to a safe value. When the deceleration falls below the threshold value, the valve returns to its original position and braking is resumed.

The anti-skid device described briefly above in the previous paragraph could be replaced by any other suitable device, for instance a more sophisticated device sensing the condition of both the front wheels 10 and 12.

To actuate the brakes on the rear wheels 16 and 18, the pressure source 40 is connected by a conduit 56 to a so-called corrector valve 58, for instance that available commercially as valve No. 475701 from the Compagnia Italiana Westinghouse Freni e Segnali. This valve is connected by means not shown to the rear axle 20.

Figure 2:
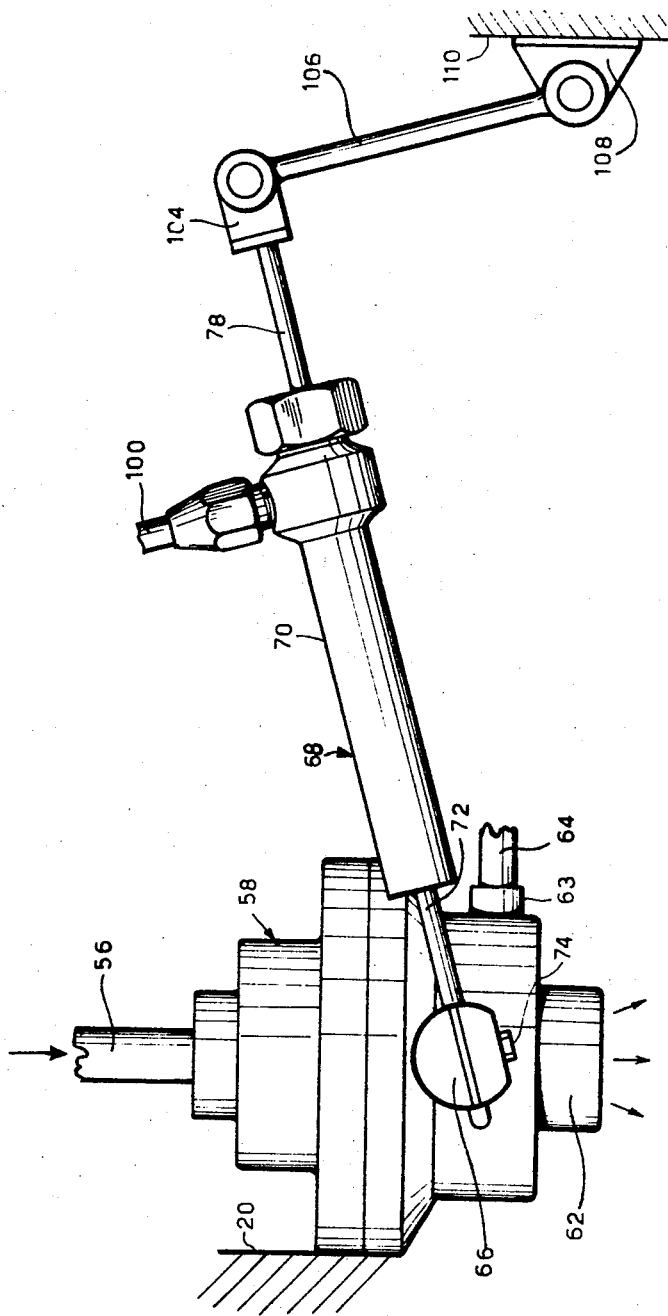
FIG. 2 is a side elevation view of certain components of the braking system of FIG. 1.

As is best seen in FIG. 2, the valve 58 has an exhaust outlet 62 leading to the atmosphere, and a pressure outlet 63 connected by a conduit 64 to conduits 65 and 67 supplying the cylinders 32 and 36 for the rear wheel brakes. The proportion of the fluid passing through the valve from the conduit 56 to the conduit 64 (the difference being exhausted through the port 62) is varied by rotation of a shaft 66.

In FIG. 2, clockwise rotation of the shaft 66 increases the proportion of the supply from the conduit 56 which enters the conduit 64, and anti-clockwise rotation reduces the proportion.

An actuator 68 is connected to the shaft 66. The actuator comprises an elongated cylindrical body 70 having fixed to itself at one end a rod 72 which is connected by a screw 74 to the shaft 66. As seen in FIG. 3, the body 70 is hollow and has a small hole 71 at the end to which is fixed the rod 72. The body 70 contains a plunger 76 which is fast with a rod 78 which extends through a cover 80 screwed on to the other end of the body 70. A spring 82 biases the plunger to the right in FIG. 3, to a limiting position in which an annular stop 84 on the rod 78 abuts on the cover 80. The plunger 76 has two heads 86 and 88, and small balls 90 of a material such as polytetrafluoroethylene are carried in the peripheries of these heads and serve to guide the plunger 76 in the cylinder 70. The head 88 is sealed in the cylinder 70 by a 0-ring 92. The rod 78 is sealed in the cover 80 by a 0-ring 94, and a further 0-ring 96 seals the cover 80 in the cylinder 70. Between the cover 80 and the plunger head 88 is located a port 98 which is connected by a flexible conduit 100 to the conduits 50, 52 and 54 (FIG. 1) supplying the front wheel brakes downstream of the anti-skid device 46. A fixed restriction 102 is located in the conduit 100 near its junction with the conduit 50.

As is seen in FIG. 2, the rod 78 is fixed to an eye 104 in which is pivotally movable one end of a linkage 106 whose other end is pivotable in a further eye 108 fixed to a part 110 of the body of the vehicle.

It is clear that, while the actuator 68 does not change length, the corrector valve 58 will be adjusted by rotation of the shaft 66 according to the load carried by the rear part of the vehicle. An increased load on the rear axle will cause the linkage 106 to sink relatively to the valve 58, and will cause clockwise rotation of the shaft 66, so increasing the proportion of the pressure from the conduit 56 which reaches the conduit 64, and thus increasing the braking power on the rear wheels. Correspondingly, a reduction in load on the rear axle causes an anti-clockwise rotation of the shaft 66 (assuming the actuator 68 to remain of constant length) and reduces the braking power at the rear wheels.

The invention provides the feature that the actuator 68 is not of fixed length but varies in length according to the variations induced by the anti-skid device 46 in the pressure applied through the conduits 50, 52, 54 to the brake cylinders 24, 28 of the front wheels 10, 12.

When a braking operation commences with the action of the driver in depressing the pedal 42, fluid under pressure is sent from the source 40 through both the conduits 44 and 56. Assuming the body of the vehicle does not change position relatively to the rear axle during braking, the initiation of braking will cause fluid under pressure to be sent from the conduit 50 through the restriction 102 and into the conduit 110. It enters the actuator 68 through the port 98 and moves the plunger 76 to the left against the action of the spring 82.

This in effect shortens the actuator 68 and causes clockwise rotation of the shaft 66, increasing the braking force on the rear wheels. If the braking action is severe and the front wheels threaten to skid, the anti-skid device 46 intervenes to release the pressure applied through the conduit 50 to the front brakes. There is accordingly a drop in pressure in the conduit 100 and in the actuator 68, causing a lengthening of the actuator under the action of the spring 82 and leading to anti-clockwise rotation of the shaft 66. Consequently, the pressure on the rear brakes falls until braking is resumed by the return of the anti-skid device to its original setting.

The restrictor 102 smooths the pressure variations in the conduit 100, which is itself of sufficient capacity to act as an absorber preventing undesirably sudden pressure decreases in the actuator 68. The general effect of the restrictor 102 is to smooth the anti-skid operation on the rear wheels of the vehicle.

When braking ceases, pressure from the rear brake cylinders 32 and 36 and the conduits 64, 65 and 67 is discharged to exhaust through the outlet 62 of the valve 58, this being the standard manner of operation of such a corrector valve.

What we claim is:

1. In a vehicle having a first wheel on a first axle and a second wheel on a second axle, a braking system for the wheels including a fluid pressure circuit and a brake on each wheel connected to the circuit, an anti-skid braking regulating device connected in the circuit to regulate the pressure supplied to the brake of the first wheel during braking of the vehicle, means to vary the pressure applied to the brake of the second wheel according to the load on the second axle, and means to vary the pressure applied to the brake of the second wheel according to variations introduced by the anti-skid device in the pressure applied to the brake of the first wheel, the means to vary the pressure applied to the brake of the second wheel according to the load on the second axle comprising a corrector valve having a rotatable member and pivotally connected rod means to rotate such member on relative movement on a body of the vehicle relative to the second axle, and the means to vary the pressure applied to the brake of the second wheel according to the variations induced by the anti-skid device in the pressure applied to the first wheel comprising actuator means to vary the length of the rod means.

2. The vehicle of claim 1, in which the actuator means comprises a fluid pressure cylinder containing a plunger acted on by a spring, and having a port for fluid to enter the cylinder and act on the plunger against the action of the spring, the port being connected by a conduit to the circuit supplying fluid under pressure to the brake of the first wheel.

3. The vehicle of claim 2, including a restriction in the conduit leading to the port of the actuator cylinder.

* * * * *